US011942104B2

(12) United States Patent
Schubert

(10) Patent No.: US 11,942,104 B2
(45) Date of Patent: Mar. 26, 2024

(54) METHOD AND DEVICE FOR ENHANCING A FULL DUPLEX COMMUNICATION SYSTEM

(71) Applicant: TeamViewer Germany GmbH, Göppingen (DE)

(72) Inventor: Volker Schubert, Eislingen (DE)

(73) Assignee: TEAMVIEWER GERMANY GMBH, Göppingen (DE)

( * ) Notice: Subject to any disclaimer, the term of this patent is extended or adjusted under 35 U.S.C. 154(b) by 0 days.

(21) Appl. No.: 17/169,117

(22) Filed: Feb. 5, 2021

(65) Prior Publication Data

US 2021/0256986 A1 Aug. 19, 2021

(30) Foreign Application Priority Data

Feb. 7, 2020 (EP) .................................... 20156191

(51) Int. Cl.
*G10L 21/0208* (2013.01)
*H04L 5/14* (2006.01)
*H04M 9/08* (2006.01)

(52) U.S. Cl.
CPC ........ *G10L 21/0208* (2013.01); *H04L 5/1461* (2013.01); *G10L 2021/02082* (2013.01); *H04M 9/082* (2013.01); *H04R 2499/15* (2013.01)

(58) Field of Classification Search
CPC .. G10L 21/0208; H04L 5/1461; H04M 9/082; H04M 1/20; H04M 1/03; H04R 3/002; H04B 3/20; G06T 7/0012
USPC .......................................................... 381/66
See application file for complete search history.

(56) References Cited

U.S. PATENT DOCUMENTS

| 5,896,463 A * | 4/1999 | Kuhn .................... G06T 7/0012 |
| | | 382/172 |
| 6,167,133 A | 12/2000 | Caceres et al. |
| 2006/0147063 A1* | 7/2006 | Chen ....................... H04M 1/03 |
| | | 379/406.01 |
| 2008/0247535 A1 | 10/2008 | Li et al. |
| 2016/0127527 A1 | 5/2016 | Mani et al. |
| 2016/0127561 A1 | 5/2016 | Mani et al. |
| 2019/0342456 A1* | 11/2019 | Sun ........................ H04M 9/082 |

FOREIGN PATENT DOCUMENTS

JP 2001320305 A * 11/2001

OTHER PUBLICATIONS

European Search Report cited in corresponding European application No. 20156191.7-1205; dated Jul. 15, 2020; 8pp.

* cited by examiner

*Primary Examiner* — Md S Elahee
(74) *Attorney, Agent, or Firm* — Lempia Summerfield Katz LLC

(57) ABSTRACT

A method for enhancing an audio signal in a full duplex communication system includes the steps of: a) receiving a far end audio signal from a communication input; b) forwarding the far end audio signal to an audio speaker; c) receiving a near end audio signal from a microphone; d) performing an echo reduction on the received near end audio signal; e) forwarding the near end audio signal after the echo reduction to a communication output; f) determining whether a residual echo still exists in the near end audio signal after the echo reduction; and g) attenuating the near end audio signal or deactivating its forwarding to the communication output if the existence of residual echo is determined.

12 Claims, 4 Drawing Sheets

METHOD AND DEVICE FOR ENHANCING A FULL DUPLEX COMMUNICATION SYSTEM

BACKGROUND

1. Field of the Disclosure

The disclosure relates to a method for enhancing an audio signal in a full-duplex communication system including the following steps:
- a) Receiving a far end audio signal from a communication input;
- b) Forwarding the far end audio signal to an audio speaker;
- c) Receiving a near end audio signal from a microphone;
- d) Performing an echo reduction within a signal enhancement chain on the received near end audio signal;
- e) Forwarding the near end audio signal after the echo reduction to a communication output.

According to another aspect, the disclosure relates to a corresponding device for enhancing the audio signal.

2. Description of the Prior Art

When establishing an audio communication using audio communication devices noticeable echo signals are a known problem. In particular for digital audio communication used e.g. for video conferencing software or remote desktop software, which provides an otherwise very good audible signal compared to analog techniques, echo signals are a major hassle for the user.

Echo signals may arise if an audio signal coming from a first communication device is output on a speaker of a second communication device. If a microphone of this second communication device is then recording the signal coming from the speaker and returning this audio signal back to the first communication device an echo signal with a certain time delay is audible.

Therefore, common audio communication implementations use a signal enhancement chain for the involved signal paths. Typical components of a signal enhancement chain are (Linear) Echo Cancellation, Residual Echo Suppression and/or Noise Suppression.

However, due to the dynamic nature of audio communication and the complicated environmental parameters involved on both end points of the audio communication the processing algorithms for Echo Cancellation and Residual Echo Suppression may fail. For example, if the second device is placed in a large room which generates larger delays for audio signals reflected back to the microphone, an echo signal would still be audible in the processed signal. Generally speaking, known signal enhancements may fail because the acoustic transfer functions of the involved sending and receiving systems and environments are not known exactly and may even change over time. Additionally, signal enhancements may fail also due to technical issues (for example driver problems) or other a priori unknown issues in the signal chain.

SUMMARY

It is therefore an object of the disclosure to provide methods and devices to enhance an audio signal, in particular to reduce echo in an audio signal of an audio communication.

This object of the disclosure is achieved by a method for enhancing an audio signal in a full duplex communication system as stated in the beginning, including the following further steps:
- f) Determining whether a residual echo still exists in the forwarded near end audio signal after the echo reduction; and
- g) if the existence of residual echo is determined:
  - Attenuating the near end audio signal,
  - Deactivating its forwarding to the communication output and/or
  - Adjusting at least one parameter of the signal enhancement chain.

The inventor has realized that if the known technical solutions to remove or at least reduce echo in a full duplex communication system may fail from time to time one could temporarily switch to a soft or hard half-duplex communication mode in order to avoid echo.

For this purpose, the general inventive idea is to determine if after applying a known echo reduction technique on the near end signal residual echo still exists. In particular, the existence of residual echo may be probed on a long-term timescale in the order of 5 s to 180 s, in particular more than 20 s, compared to traditional echo reduction techniques which operate on a timescale of not more than 2 seconds. This may then activate the half-duplex behavior which may comprise attenuating the near end audio signal before it is forwarded (soft half-duplex) or even fully deactivating the forwarding of the near end audio signal (hard half-duplex), which is equivalent to falling back from a full-duplex communication to a half-duplex communication.

A further additional or alternative reaction to the detection of residual echo is to adjust any parameter of the signal enhancement chain, in particular the echo reduction component, to improve the suppression of echo. The signal enhancement chain may only include the echo reduction component but may also include further known components, which might also comprise adjustable parameters.

In the context of this disclosure, the communication system and any components thereof may be implemented in hardware and/or in software. In particular the different components of the communication system do not have to be realized as a single piece of software.

E.g. on a first communication client the far end signal on its way from the communication input towards the audio speaker may be subjected to various signal modifications like a volume control, an equalizer and/or other sound effects. Such signal modifications may be implemented as part of a signal path provided by an operating systems running the first communication client. The same may apply to the near end signal e.g. with a microphone gain adjustment or the like. At the same time, performing the echo reduction and determining whether residual echo still exists may be implemented in a software package like a conferencing or remote desktop software while making use of the above mentioned software and/or hardware parts provided by the computer system on which the software package is installed.

A communication input and a communication output may include any type of connection towards a far end side of the communication system, e.g. towards a second communication client and/or an intermediate server. In particular, the communication input and the communication output may be a software interface receiving respectively sending a digital audio signal stream from/towards other components. These components may then be responsible for the connection over a wired or wireless network like e.g. LAN, WAN, WLAN, the Internet and/or any mobile cell phone network.

In one example, the step for determining the existence of residual echo includes a residual echo existence estimation which compares the near end audio signal and the far end audio signal in a frequency domain and statistically analyses the outcome.

Such methods are more resilient with respect to non-linear modifications of the involved signals.

In one example, the residual echo existence estimation takes into account the far end audio signal by using a loopback signal, which represents the far end audio signal after it has been transferred through a volume and effects component. As such the loopback signal may be seen as a representation of the far end audio signal as close as possible to the audio speaker.

However, in case the loopback signal is not accessible to the components which implement the inventive methods (e.g. due to OS restrictions), the far end signal can also be directly used. The residual echo existence estimation may then include a method which estimates the effects of the volume and effects component on the far end audio signal and takes these results into account for the estimation of residual echo.

In one example, estimating the existence of residual echo comprises transferring time slots of the near end audio signal and the far end audio signal into the frequency domain thereby providing a plurality of time step dependent near end spectra and a plurality of time step dependent far end spectra.

Although other spectral transformations are feasible, short-term Fourier transforms have proven to be reliable tool for spectral analyses which work on short-term timescales. However, the inventor has realized that short-term Fourier transforms are also useful for estimating residual echo existence on a long-term timescale.

In one example, each time step dependent near end spectrum is compared to a plurality of time delayed versions of the time step dependent far end spectra by calculating a distance value between the time step dependent near end spectrum and each of the plurality of time step dependent far end spectra.

By comparing for each time step the spectrum of the current near end spectrum with a different time step dependent far end spectrum a plurality of delay hypothesis are probed. In this context comparing spectra means to calculate a distance value between the two spectra according to a given definition of the distance between these spectra.

In one example, calculating the distance value is defined as:

$$d(X,Y)=\|N(C(X))-N(C(Y))\|$$

wherein X stands for the near end spectrum and Y for the far end spectra and where C(X)=frequency window function keeping only an inner part of a spectrum between a first and second cutoff frequency N(X)=X−mean(X)=zero-mean version of X with mean $(X)=\Sigma_\omega X[\omega]/\Sigma_\omega 1$ $$\|X\| = \sqrt{\sum_\omega X[\omega]^2} = \text{Euclidean vector norm of } X.$$

This allows to normalize the different time dependent spectra.

In one example, calculating the distance value includes using a set of preset mapping templates $T_i$, which mapping templates modify the near end spectra and/or the far end spectra in order to take into account for prototypic realistic acoustic transfer functions.

In one example, using the set of preset mapping templates $T_i$, is performed by calculating a different distance value for each mapping template and choosing the minimal distance value as the final distance value.

Thereby the best matching preset mapping template $T_i$ is automatically chosen. If it turns out during estimation that a particular preset mapping template $T_i$ matches often, the algorithm may drop support for the other preset mapping templates $T_i$ during further processing.

In one example, the distance value for each time delay is smoothed by averaging the distance value over several time steps.

Because in each time step a new near end spectrum is generated, the distance values for a given time delay with respect to the far end spectra can be averaged over at least 10, 20, 50 or more distance values.

In one example, from all distance values depending on the time delay the minimal distance value defines a delay estimate for a given time step, which delay estimate is added to a first histogram.

In one example, in a further step the first histogram is inspected and if a peak is discovered the corresponding delay estimate is considered a "good" delay estimate which is added to a second histogram.

In one example, in a further step the second histogram is inspected and if a peak is discovered it is determined that an echo exists.

By these steps the outcome of the residual echo existence estimation is smoothed.

In one example, the step of attenuating the near end audio signal or deactivating its forwarding to the communication output includes inspecting the received far end audio signal and attenuating the signal or deactivating the forwarding only if the far end audio signal comprises a signal level above a given first threshold.

This is a measure of precaution against false positive estimates of echo existence, because an echo may only be present if the far end audio signal provides a significant signal level. The signal level of the far end audio signal may be the loudness, the power and/or other signal quantities to measure the intensity of an audio signal, like e.g. sound pressure level.

In addition to the automatic trigger by the residual echo estimation, the near end audio signal may also be attenuated or its forwarding to the communication output be deactivated independent of the existence of residual echo if the far end audio signal comprises a signal level above a given second threshold or if a user explicitly activates the half duplex behavior. This can prevent echo even in cases when the residual echo estimation fails.

According to another aspect, the disclosure provides a device for enhancing an audio signal in a full duplex audio communication system comprising
  a) a communication input configured to receive a far end audio signal,
  b) an audio speaker, to which the far end audio signal is forwarded,
  c) a microphone configured to receive a near end audio signal,
  d) an echo reduction component within a signal enhancement chain, performing an echo reduction on the near end audio signal, e) a communication output, to which the near end audio signal is forwarded after the echo reduction,
wherein
f) the device comprises a half-duplex safeguard, which determines whether a residual echo still exists in the near end audio signal after the echo reduction, and if the existence of residual echo is determined
attenuates the near end audio signal,
deactivates its forwarding to the communication output and/or
adjusts at least one parameter of the signal enhancement chain.

BRIEF DESCRIPTION OF THE DRAWINGS

Various features and advantages of the present disclosure may be more readily understood with reference to the following detailed description taken in conjunction with the accompanying drawings in which.

DETAILED DESCRIPTION OF DISCLOSED EMBODIMENTS

Figure 1:
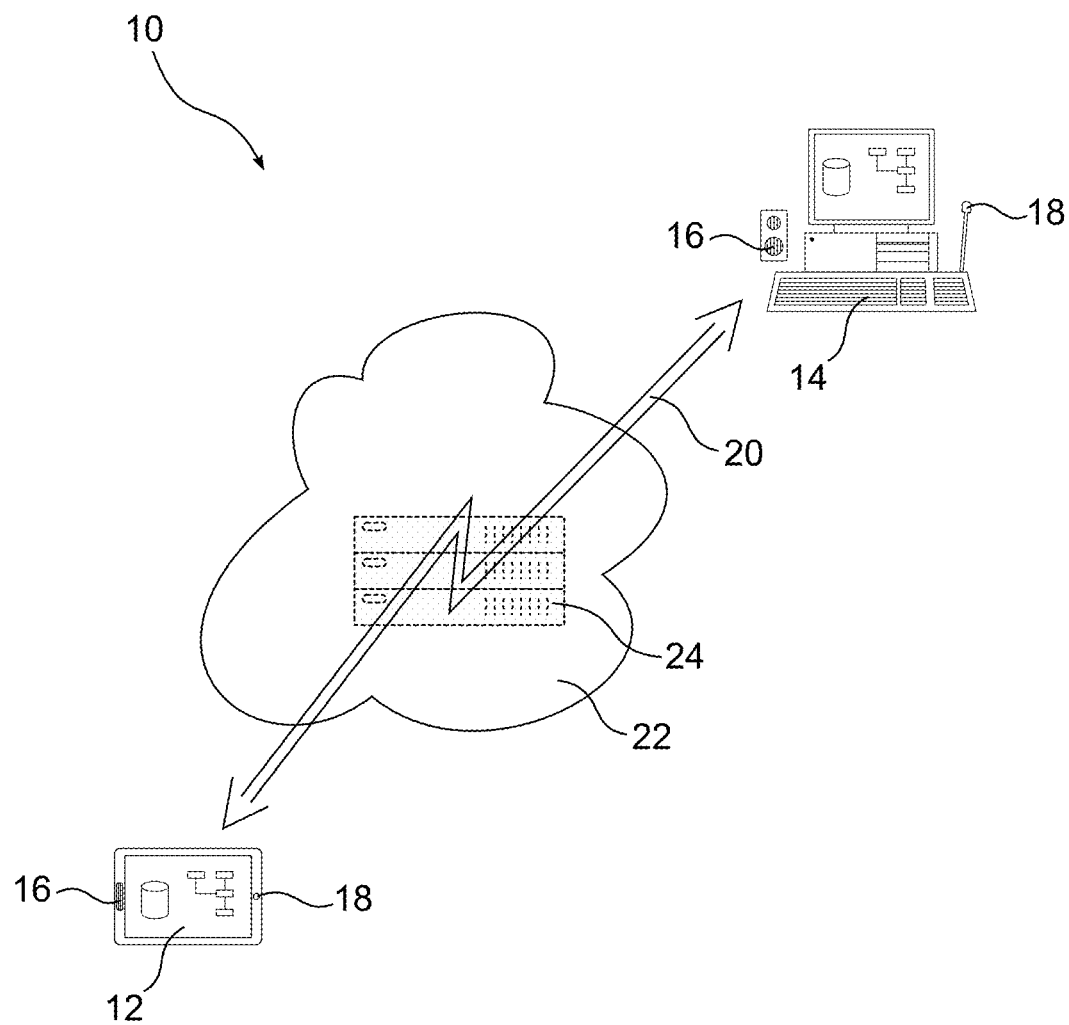
FIG. 1 shows a schematic view of a full duplex communication system.

FIG. 1 shows a full duplex communication system 10 comprising a first communication client 12 and a second communication client 14.

The first communication client 12, which may be represented by a mobile phone, comprises a speaker 16 and a microphone 18 for audio communication.

The second communication client 14, which may be represented by a personal computer, also comprises a speaker 16 and a microphone 18.

The first and second communication clients 12, 14 establish an audio communication connection 20 according to know standards like e.g. a TCP and/or UDP IP-connection through the Internet 22 or other network structures. As depicted by dashed lines the communication connection 20 may also include a relay server 24 as an intermediate structure between the first and second communication clients 12, 14.

Figure 2:
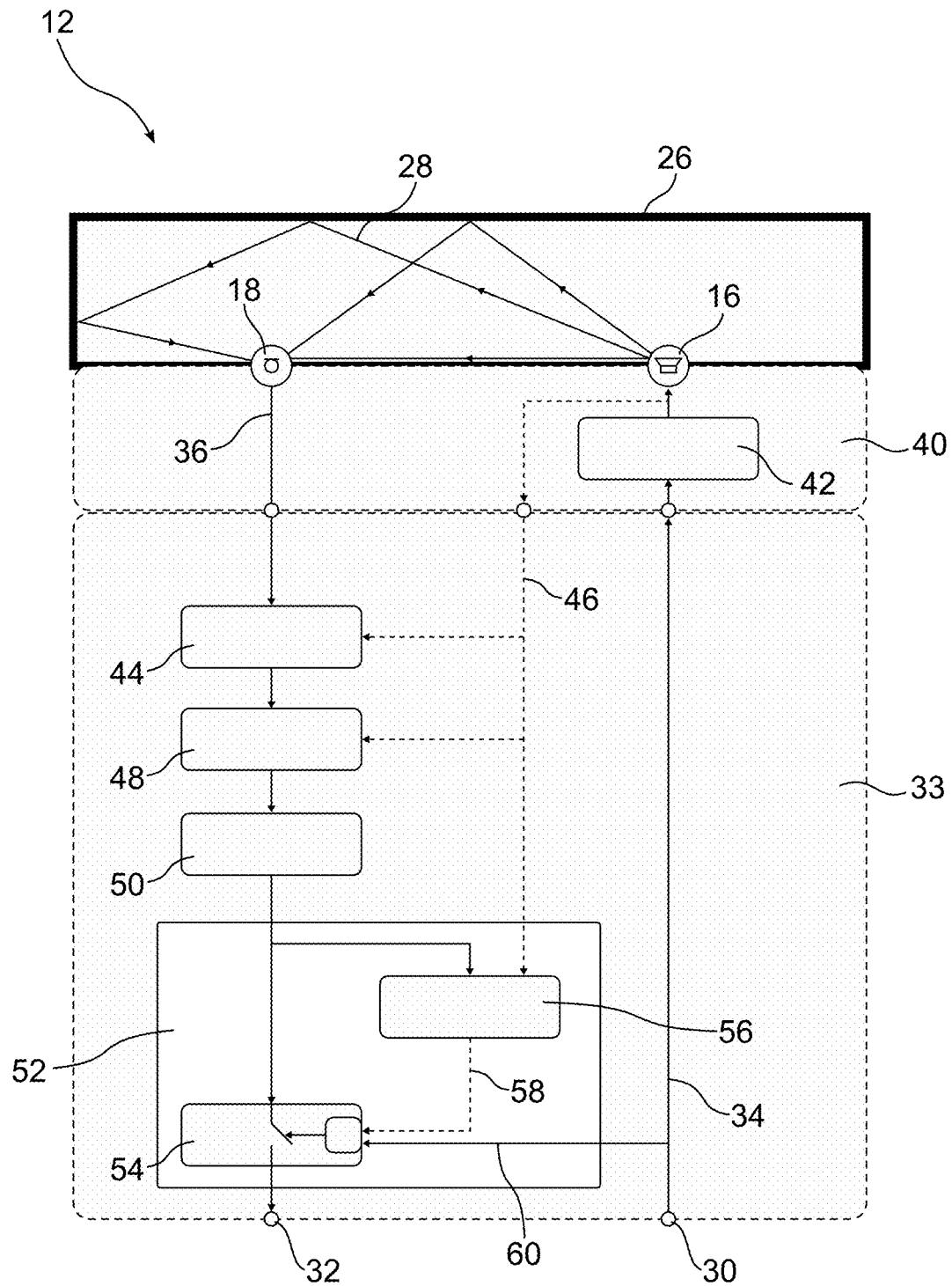
FIG. 2 shows a more detailed schematic view of various processing components involved in a signal processing chain of the full duplex communication system.

FIG. 2 shows a schematic representation of major components of the first communication client 12 involved in the audio communication connection 20. The shown components would commonly be implemented in software. However, some or all parts could also be implemented in hardware like e.g. specialized FPGAs.

First, FIG. 2 shows in its upper part schematically the speaker 16 and the microphone 18 of the first communication client 12. The speaker and the microphone 18 are arranged within an acoustic environment 26, which could be the room in which the first communication client 12 resides.

As can be seen by the arrow lines 28 any audio signal leaving the loudspeaker 16 may travel towards the microphone 18 on different acoustic paths within the acoustic environment 26. Some of these paths could be rather direct but other paths may include one or more reflections e.g. at walls or other pieces of furniture.

In the lower part of FIG. 2 a communication input 30 and a communication output 32 are shown for receiving a far end audio signal 34 from the second communication client 14 respectively for transmitting a near end audio signal 36 to the second communication client 14. From an implementation point of view the communication input 30 and communication output 32 may be realized as data stream interfaces between a signal treatment subsystem 33 (dashed surrounding lines in FIG. 2) and other communication subsystems of the communication clients 12, 14.

The signal treatment subsystem 33 may be implemented as a part of a remote desktop application or a video conferencing system. However, the signal treatment subsystem 33 may also be provided as a single piece of software.

In the present embodiment, the far end audio signal 34 received on the communication input 30 is transferred to a standard system audio subsystem 40 usually provided by the operating system of the communication client 12. The system audio subsystem 40 includes a volume control and effects component 42. This volume control and effects component 42 may for example optimize the far end audio signal 34 with respect to the frequency response of the speaker 16 in order to provide a better audio quality to the user. The far end audio signal 34 is then forwarded to the speaker 16.

On the near end side of the first communication client 12 the near end signal 36 is received from the microphone 18 and then undergoes a signal enhancement chain.

First, after being forwarded through the system audio component 40, an echo cancellation is performed on the near end audio signal 36 by an echo cancellation component 44 using a loopback signal 46 representative of the far end audio signal 34. Such an echo cancellation component 44 is known from the State of the Art and the loopback signal 46 may be taken from the system audio subsystem 40 after the far end audio signal 36 has undergone the modifications from the volume and effects component 42. As such the loopback signal 46 is the best approximation of the signal played through the speakers 16.

For further improvement the near end audio signal 36 may then be routed through a residual echo suppression component 48 also known from the State of the Art. Again, the loopback signal 46 is used for performing the residual echo suppression on the near end audio signal 36.

Finally, the near end audio signal 36 may undergo a noise suppression in a noise suppression component 50 before it is forwarded to a component essential for the disclosure referred here as a half-duplex safeguard 52.

The half-duplex safeguard 52 mainly comprises a half-duplex component 54 and a residual echo existence estimator 56.

The residual echo existence estimator 56 determines whether a residual echo still exists in the near end audio signal 36 after it has undergone echo cancellation and if applicable residual echo suppression and/or noise reduction. If residual echo still exists, the residual echo existence estimator 56 provides an activation signal 58 to the half-duplex component 54. Thereby the half duplex component 54 works only as a safeguard and will only be activated, if there is an audible residual echo in the processed near end audio signal.

When the half duplex component 54 is activated it inspects the received far end audio signal 34 as shown by a reference signal line 60 in FIG. 2. The half-duplex component 54 then deactivates forwarding of the near end audio signal 36 to the communication output 32 only if the far end audio signal 34 comprises a signal level above a given threshold. In one example, as shown in FIG. 2, the half-duplex component 54 uses the received far end audio signal 34 instead of the loopback signal 46 as a reference, because the far end audio signal 34 has a known average loudness during far talk.

If the half duplex component 54 is deactivated because no residual echo is determined by the residual echo existence estimator 56, the near end audio signal 36 is continuously forwarded to the communication output 32.

In other words, whenever a strong playback signal is detected on the far end audio signal 34 and residual echo exists in the already processed near end audio signal 36, the half-duplex safeguard 52 shuts down the signal path to the communication output 32.

As a result, the near end audio signal 36 transferred to the second communication client 14 is muted when an echo condition is present on the side of the first communication client 12. Even though the user of communication device 12 is also muted by this procedure overall user comfort is greatly improved.

The second communication client 14 may comprise the same signal treatment subsystem 33 for handling echo conditions on the side of the second communication client 14.

The residual echo existence estimator 56 works as follows:

Generally speaking, the residual echo existence estimator 56 determines the existence of residual echo by comparing the near end audio signal 36 and the far end audio signal 34 (respectively the loopback signal 46 which represents the far end audio signal 34).

An echo exists if both signals show the same or at least similar signal features. However, since the acoustic environment 26 provides a number of different acoustic paths from the speaker 16 to the microphone 18 the signal features may be delayed in the near end audio signal 36 compared to the far end audio signal 34. Therefore, the residual echo existence estimator 56 has to estimate according to different delays. The delays which are estimated may comprise the sum of the rendering and capturing system delays, the direct acoustic path delay and the signal enhancement chain up to the residual echo existence estimator 56.

Instead of relying on fast cross-correlation methods which directly compare two signals, the inventors found that spectral domain methods are more stable against non-linear modifications of the speaker signal, which can happen on the acoustic path (like distortions) and on the signal enhancement path (echo reduction, residual echo suppression and/or noise suppression). Therefore, the residual echo existence estimator 56 compares the signals in a frequency domain and statistically analyzes the outcome.

In order to reliably decide for or against residual echo existence, statistical smoothing of the delay estimates is essential.

In detail the residual echo existence estimation may include the following steps, wherein for a better mathematical understanding the signals are now reference by a variable letters and not by the reference numeral:

Step 1: Real-Time STFT Calculation

For both the near end audio signal x and the far end audio signal y, their respective discrete log-spectrograms are calculated in real-time (based on "Short-Time-Fourier-Transforms", STFT): For each time step k (e.g. each 10 ms), a frame $x_k$ of 20 ms length is taken from the near end audio signal x, weighted with a common window function w, like Blackman or Hamming, and then the Discrete Fourier Transform DFT($x_k \cdot w_k$)=: $(a_\omega)_\omega$ is calculated, $$a_\omega = \sum_{t=0}^{N-1} e^{-2\pi i t \omega/N} x_k[t] \cdot w[t],$$

for each frequency bin $\omega$

Figure 3:
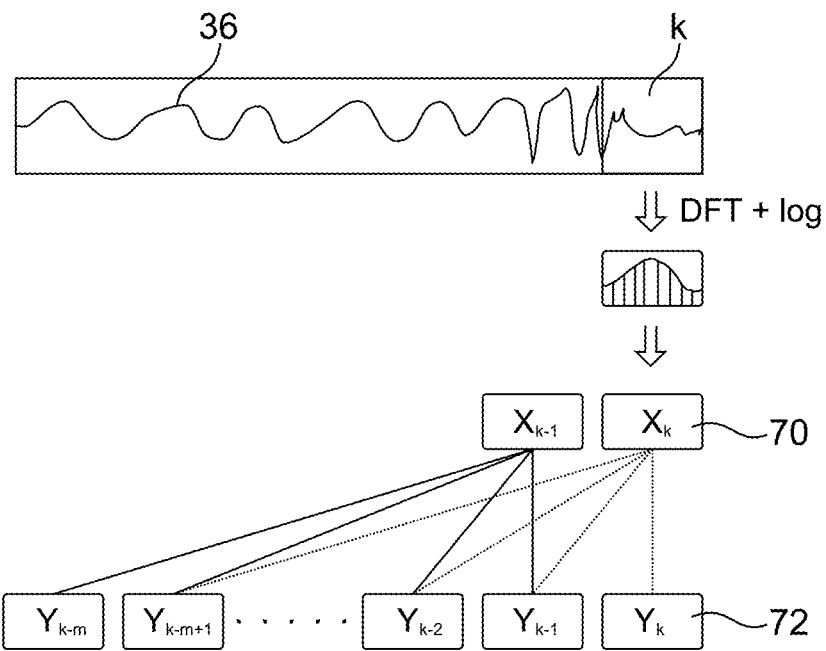
FIG. 3 a schematic view showing the processing of signals within a residual echo existence estimator.

From the complex DFT $(a_\omega)_\omega$ the residual echo existences estimator 56 calculates the power DFT $(abs(a_\omega)^2)_\omega$ (square of the absolute values), and from that its logarithm. The result will be denoted as $X_k$ and referred to as a "time step dependent near end spectrum 70" at time step k as shown in FIG. 3.

In particular, $X_k$ maps each frequency bin $\omega$ to a non-negative real number, $X_k(w)=2 \cdot \log(abs(a_\omega))$, for each frequency bin $\omega$ Analogously, the "time step dependent far end spectrum 72" of the far end audio signal y (respectively the loopback signal 46) is calculated at time step k and is in the following denoted by $Y_k$.

Thereby, the sequence of frames and spectra are ordered in the following way:

| Start time | 0 ms | 10 ms | 20 ms | ... | k * 10 ms |
| --- | --- | --- | --- | --- | --- |
| Index | 0 | 1 | 2 | ... | k |
| Frame | $x_0$ | $x_1$ | $x_2$ | | $x_k$ |
| Spectrum | $X_0$ | $X_1$ | $X_2$ | | $X_k$ |

Delay Hypotheses

One may then define a search interval for the delay hypotheses, like 0 ms to 200 ms, which means that one expects to find a "copy" of the far end audio signal y within the near end audio signal x with a delay of 0 ms up to 200 ms.

So, the goal is to find a $\tau \in (0\ ms, 200\ ms)$ such that $x[t] \sim y[t-\tau]$, where the relation ~ means "similar from an acoustic point of view", and the signals are assumed to be restricted to a given period of time of fixed length. Allowed deviations also include non-linear transformations.

The search will actually be performed in the spectral domain. Therefore, one tries to find an integral $\kappa \in [0, m]$ such that $X(k) \sim Y(k-\kappa) \forall k$.

If as shown in the present embodiment a time step length of 10 ms is taken, the potential time shifts from 0 ms to 200 ms correspond to m index shifts from 0 up to 20=m−1.

To decide for similarity, a distance measure is introduced.

For explanation purposes we will first look at a single time step (i.e. two spectra), and then at a sequence of time steps (i.e. spectra-sequence).

Step 2: Spectra Distance Calculation for Each Delay Hypothesis

For the current time step k, the m distance values are calculated $d(X_k, Y_k) =: d_{k,0}, d(X_k, Y_{k-1}) =: d_{k,1}, \ldots, d(X_k, Y_{k-m+1}) =: d_{k,m-1}$ In a first approach, the distance between two spectra X, Y may be defined as:

$d(X, Y) = \|N(C(X)) - N(C(Y))\|$ where

C(X)=part of spectrum between 500 Hz and 4000 Hz (outer bins removed) for taking into account only a frequency window;

$N(X)=X-\text{mean}(X)=$ zero-mean version of $X$ $\text{mean}(X)=\Sigma_\Omega X[\omega]/\Sigma_\omega 1$ for normalizing the signal levels $$\|X\| = \sqrt{\sum_\omega X[\omega]^2} = \text{Euclidean vector norm of } X.$$

To cope with the fact that the acoustic transfer function of the acoustic environment 26 is unknown, an improved distance calculation using a set of preset mapping templates $T_i: \Omega \to R$ (mapping from $\Omega$, the frequency range of the FFT output, to the real numbers) can be used:

$d(X,Y)=\min_i d_i(X,Y)$ $d_i(X,Y)=\|N(C(X+T_i))-N(C(Y+T_i))\|$

The set of preset mapping templates should be kept small but could be based on prototypic realistic transfer functions (laptop speaker to laptop microphone). Such realistic transfer functions are often characterized by a peak in the middle frequencies (1000 Hz up to 2000 Hz).

Step 3: Delay Hypothesis for Current Time Step

For a first smoothing, spectra-sequence distances of length 500 ms are calculated from the spectra-distances for each time delay hypothesis. This is done by averaging the frame based distances.

$X_k=(X_{k-s+1}, \ldots, X_{k-1}, X_k)$ $$d(X_k, Y_l) := \frac{1}{s}\sum_{i=0}^{s-1} d(X_{k-i}, Y_{l-i}), s = 50$$

By selecting the time delay with minimal spectra-sequence distance, one gets the time delay estimate for the current time step.

$t_k:=\text{argmin}_\tau d(X_k, Y_{k-\tau})$

Figure 4:
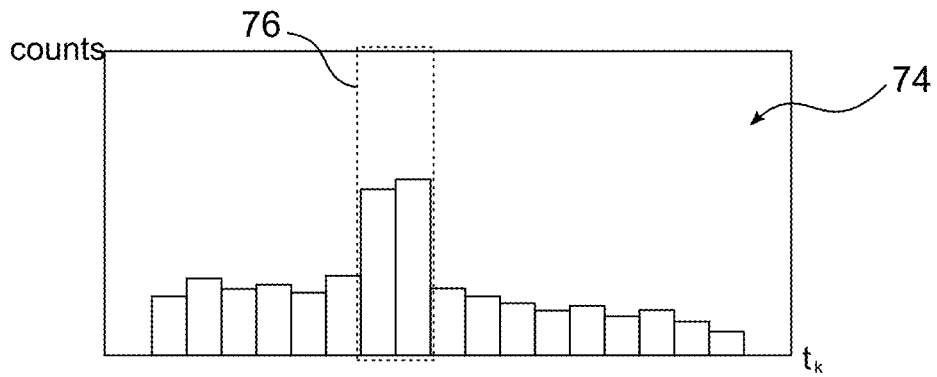
FIG. 4 a first histogram of estimated time delays.

If this time delay estimate $t_k$ and the distance value d are within reasonable bounds, the delay estimate is added to a first short-term histogram 74 (counts vs $t_k$) of time delay estimates $t_k$ (compare FIG. 4). Otherwise, an "Undefined" value is added to the histogram 74.

Step 4: Statistical Smoothing

In a further loop, e.g. every 1 s, the first histogram 74 of time delay estimates $t_k$ (represented as indices; f(i) the relative frequency of i) is inspected, and the 20 ms wide maximum frequency area 76 (comprising 2 bins) is determined:

$\kappa:=\text{argmax}_i(f(i)+f(i+1))$

Figure 5:
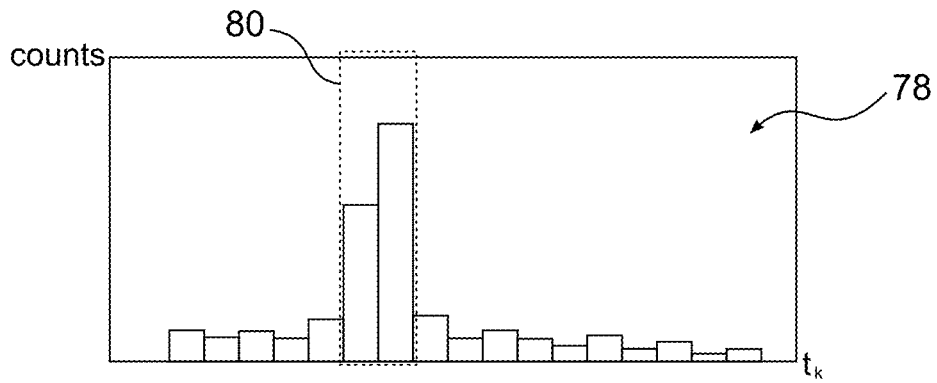
FIG. 5 a second histogram of estimated time delays supplied by inspection of the first histogram.

If this frequency area $f(\kappa)+f(\kappa+1)$ covers more than 80% of the histogram (real samples and "undefined" samples), the sample center $\kappa$ of the area (representing a delay of $\kappa*10$ ms), is considered a "good" time delay estimate (visually, a peak in the distribution), and is added to a second long-term histogram 78 (compare FIG. 5) for outlier suppression. The first histogram is cleared after inspection.

As outlier suppression and basis for residual echo existence estimation, a second long-term moving-window histogram 78 of e.g. 60 seconds length can be used. However, the long term moving-window for the second histogram 78 may have other suitable time constants as e.g. 10 seconds to 180 seconds. In fact, all the given time constants are given as a way of example only and may be varied e.g. depending on the computational load restrictions envisaged for the residual echo existence estimator.

Step 5: Decision for Determining Echo or Non-Echo Condition

For determining whether or not residual echo exists every 1 s the histogram of good delay estimates (the second histogram 78) is inspected: If a 20 ms wide maximum area 80 covers more than 20% of the histogram, then and only then, the residual echo existence estimator decides for "echo".

Further Embodiments

Figure 6:
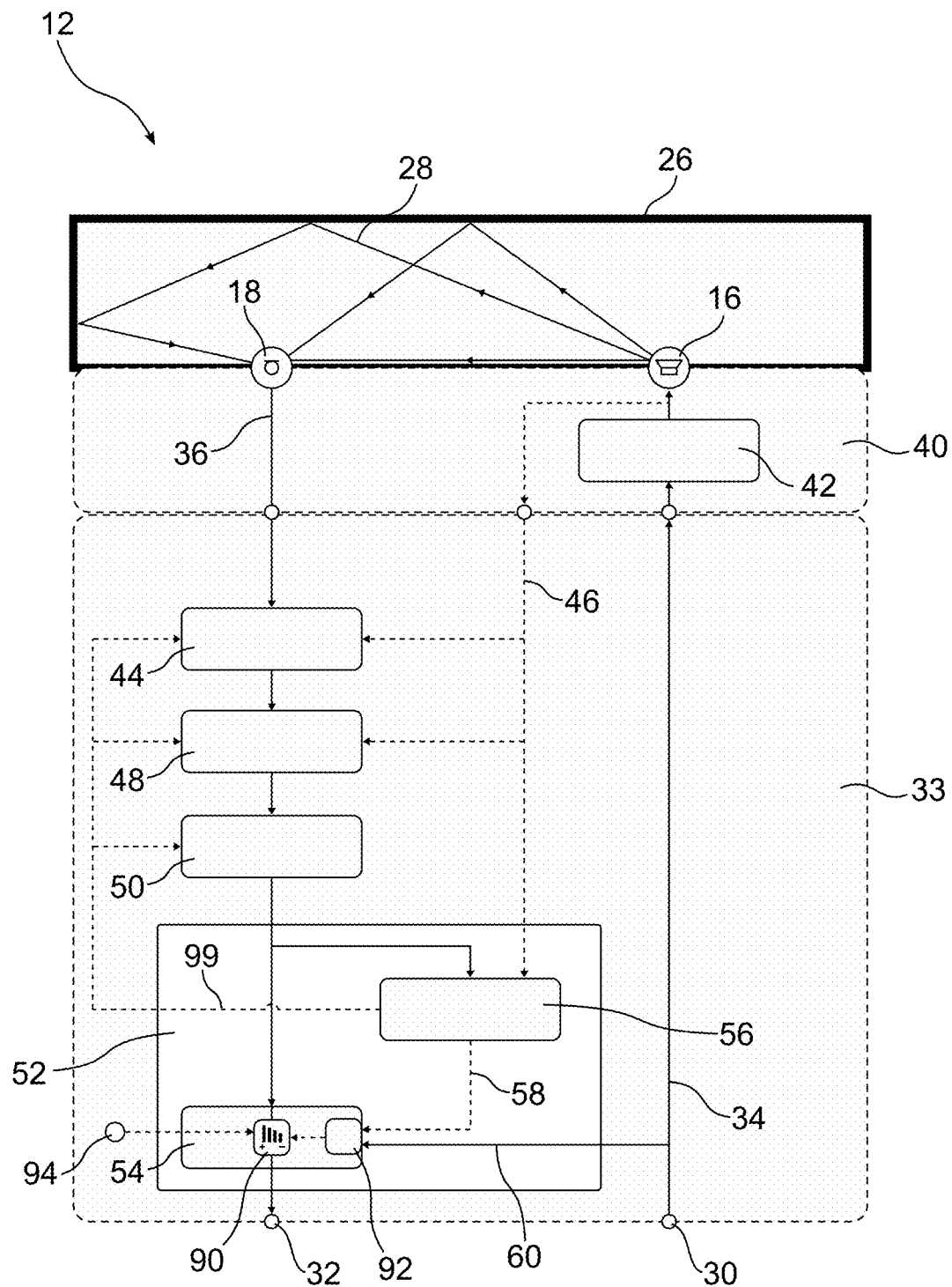
FIG. 6 shows a schematic view similar to FIG. 2 according to another embodiment.

FIG. 6 shows a further embodiment wherein the same components or components having an identical or similar function show are referenced by the same numerals as in the embodiments described above.

The embodiment of FIG. 6 differs from the above embodiments in the details of the half duplex component 54. Instead of shutting down the signal path to the communication output 32 the present half duplex component 54 attenuates the near end audio signal 36 as depicted by an attenuator unit 90. In this case the near end audio signal 36 is still forwarded to the communication output 32 and the half duplex behavior results from the attenuation of the near end audio signal 36.

Attenuating the near end audio signal 36 may include any attenuation grade to lower the volume level (which may be lowered by more than 50%, in particular by more than 75%) and even an attenuation to zero level, which may be represented by an empty stream. This strongly resembles deactivating the forwarding of the near end audio signal 36.

Attenuating the near end audio signal 36 may also depend on the signal level of the far end audio signal 34 as depicted by a control block 92. For example, if residual echo existence is determined the half duplex component 54 may attenuate the near end audio signal 36 stronger if a higher signal level is detected on the far end audio signal 34 (cf. reference line 60) and weaker if a lower signal level is detected. This may even include non-linear dependencies and/or at least one threshold stepping.

Furthermore, the control block 92 shown in FIG. 6 also implements to attenuate the near end audio signal 36 additionally independent of the state of the residual echo existence estimator 56 if the signal level of the far end audio signal 34 on reference line 60 is above a second upper threshold. Thereby, any talkback is prevented when a very strong far end audio signal 34 is received. Similarly, a trigger 94 manually operated by the user may activate attenuation. Of course, these ideas may also be used in the context of deactivated signal forwarding according to FIG. 2.

As shown by the dashed line 99 the residual echo existence estimator 56 may also be connected to the components 44, 48 and/or 50 of the signal enhancement chain in order to adjust parameters if a residual echo is detected.

Finally, attenuation of the near end audio signal 36 may also be implemented by providing an attenuation flag or value within the forwarded signal stream. In this case, the second communication client 14 may use the information from the attenuation flag or value to lower the e.g. its audio output volume. One may even provide the users of the second communication client 14 with the possibility to set preferences how strong the incoming stream of the near end audio signal 36 (which corresponds to the far end audio signal 36 on the second communication client 14) should be attenuated in case the attenuation flag or value shows that a residual echo existence is detected on the first communication client 12.

The invention claimed is:

1. A method for enhancing an audio signal in a full duplex communication system, the method comprising the following steps:
   a) receiving a far end audio signal from a communication input;
   b) forwarding the far end audio signal to an audio speaker;
   c) receiving a near end audio signal from a microphone;
   d) performing an echo reduction within a signal enhancement chain on the received near end audio signal using the far end audio signal;
   e) forwarding the near end audio signal after the echo reduction to a communication output;
   f) determining whether a residual echo still exists in the near end audio signal after the echo reduction, wherein determining the existence of residual echo includes a residual echo existence estimation that compares the near end audio signal after echo reduction with the far end audio signal again, and
   g) if the existence of residual echo is determined:
      attenuating the near end audio signal;
      deactivating its forwarding to the communication output and/or
      adjusting at least one parameter of the signal enhancement chain,
   wherein the residual echo existence estimation compares the near end audio signal and the far end audio signal in a frequency domain and statistically analyzes the outcome,
   wherein estimating the existence of residual echo comprises transferring time slots of the near end audio signal and the far end audio signal into the frequency domain thereby providing a plurality of time step dependent near end spectra and a plurality of time step dependent far end spectra,
   wherein each time step dependent near end spectrum is compared to a plurality of time delayed versions of the time step dependent far end spectra by calculating a distance value d between the time step dependent near end spectrum and each of the plurality of time step dependent far end spectra, and
   wherein calculating the distance value d is defined as:

$$d(X,Y)=\|N(C(X))-N(C(Y))\|$$

wherein X stands for the near end spectrum and Y for the far end spectra and where
   $C(X)$=frequency window function keeping only an inner part of a spectrum between a first and second cutoff frequency
   $N(X)=X-\text{mean}(X)$=zero-mean version of X with mean $(X)=\Sigma_\omega X[\omega]/\Sigma_\omega 1$
   $\|X\|=\sqrt{\Sigma_\omega X[\omega]^2}$=Euclidean vector norm of X.

2. The method according to claim 1, wherein calculating the distance value d includes using a set of preset mapping templates $T_i$ which mapping templates modify the near end spectra and/or the far end spectra in order to take into account for prototypic realistic acoustic transfer functions.

3. The method according to claim 2, wherein using the set of preset mapping templates $T_i$, is performed by calculating a different distance value d for each preset mapping template $T_i$ and choosing the minimal distance value as the final distance value.

4. The method according to claim 1, wherein the distance value d for each time delay t k is smoothed by averaging the distance value d over several time steps k.

5. The method according to claim 1, wherein, from all distance values d depending on the time delay $t_k$, the minimal distance value defines a delay estimate for a given time step, which delay estimate $t_k$ is added to a first histogram.

6. The method according to claim 5, wherein, in a further step, the first histogram is inspected and if a peak is discovered the corresponding delay estimate $t_k$ is considered a "good" delay estimate $t_k$, which is added to a second histogram.

7. The method according to claim 6, wherein, in a further step, the second histogram is inspected and if a peak is discovered it is determined that an echo exists.

8. The method according to claim 1, wherein the step of attenuating the near end audio signal or deactivating its forwarding to the communication output includes inspecting the received far end audio signal and deactivating the forwarding only if the far end audio signal comprises a signal level above a given threshold.

9. A device for enhancing an audio signal in a full duplex audio communication system, the device comprising:
   a) a communication input configured to receive a far end audio signal;
   b) an audio speaker to which the far end audio signal is forwarded;
   c) a microphone configured to receive a near end audio signal;
   d) an echo reduction component within a signal enhancement chain performing an echo reduction on the near end audio signal using the far end audio signal;
   e) a communication output to which the near end audio signal is forwarded after the echo reduction; and
   f) a half-duplex safeguard, which
      determines whether a residual echo still exists in the near end audio signal after the echo reduction, wherein, for determining the existence of residual echo, a residual echo existence estimator compares the near end audio signal after the echo reduction with the far end audio signal again, and
      if the existence of residual echo is determined
         attenuates the near end audio signal,
         deactivates its forwarding to the communication output, and/or
         adjusts at least one parameter of the signal enhancement chain,
   wherein the residual echo existence estimation compares the near end audio signal and the far end audio signal in a frequency domain and statistically analyzes the outcome,
   wherein estimating the existence of residual echo comprises transferring time slots of the near end audio signal and the far end audio signal into the frequency domain thereby providing a plurality of time step dependent near end spectra and a plurality of time step dependent far end spectra,
   wherein each time step dependent near end spectrum is compared to a plurality of time delayed versions of the time step dependent far end spectra by calculating a distance value d between the time step dependent near end spectrum and each of the plurality of time step dependent far end spectra, and
   wherein calculating the distance value d is defined as:

$$d(X,Y)=\|N(C(X))-N(C(Y))\|$$

wherein X stands for the near end spectrum and Y for the far end spectra and where C(X)=frequency window function keeping only an inner part of a spectrum between a first and second cutoff frequency N(X)=X− mean(X)=zero-mean version of X with mean (X)=$\Sigma_\omega X[\omega]/\Sigma_\omega 1$ $\|X\|=\sqrt{\Sigma_\omega X[\omega]^2}$=Euclidean vector norm of X.

10. A method for enhancing an audio signal in a full duplex communication system, the method comprising the following steps:
   a) receiving a far end audio signal from a communication input;
   b) forwarding the far end audio signal to an audio speaker;
   c) receiving a near end audio signal from a microphone;
   d) performing an echo reduction within a signal enhancement chain on the received near end audio signal;
   e) forwarding the near end audio signal after the echo reduction to a communication output;
   f) determining whether a residual echo still exists in the near end audio signal after the echo reduction, and
   g) if the existence of residual echo is determined:
      attenuating the near end audio signal;
      deactivating its forwarding to the communication output and/or
      adjusting at least one parameter of the signal enhancement chain,
   wherein the step for determining the existence of residual echo includes a residual echo existence estimation which compares the near end audio signal and the far end audio signal in a frequency domain and statistically analyzes the outcome,
   wherein estimating the existence of residual echo comprises transferring time slots of the near end audio signal and the far end audio signal into the frequency domain thereby providing a plurality of time step dependent near end spectra and a plurality of time step dependent far end spectra,
   wherein each time step dependent near end spectrum is compared to a plurality of time delayed versions of the time step dependent far end spectra by calculating a distance value d between the time step dependent near end spectrum and each of the plurality of time step dependent far end spectra, and
   wherein calculating the distance value d is defined as:

$d(X,Y)=\|N(C(X))-N(C(Y))\|$ wherein X stands for the near end spectrum and Y for the far end spectra and where
   C(X)=frequency window function keeping only an inner part of a spectrum between a first and second cutoff frequency
   N (X)=X−mean(X)=zero-mean version of X with mean (X)=$\Sigma_\omega X[\omega]/\Sigma_\omega 1$ $\|X\|=\sqrt{\Sigma_\omega X[\omega]^2}$ = Euclidean vector norm of $X$.

11. A method for enhancing an audio signal in a full duplex communication system, the method comprising the following steps:
   a) receiving a far end audio signal from a communication input;
   b) forwarding the far end audio signal to an audio speaker;
   c) receiving a near end audio signal from a microphone;
   d) performing an echo reduction within a signal enhancement chain on the received near end audio signal;
   e) forwarding the near end audio signal after the echo reduction to a communication output;
   f) determining whether a residual echo still exists in the near end audio signal after the echo reduction, and
   g) if the existence of residual echo is determined:
      attenuating the near end audio signal;
      deactivating its forwarding to the communication output and/or
      adjusting at least one parameter of the signal enhancement chain,
   wherein the step for determining the existence of residual echo includes a residual echo existence estimation which compares the near end audio signal and the far end audio signal in a frequency domain and statistically analyzes the outcome,
   wherein estimating the existence of residual echo comprises transferring time slots of the near end audio signal and the far end audio signal into the frequency domain thereby providing a plurality of time step dependent near end spectra and a plurality of time step dependent far end spectra,
   wherein each time step dependent near end spectrum is compared to a plurality of time delayed versions of the time step dependent far end spectra by calculating a distance value d between the time step dependent near end spectrum and each of the plurality of time step dependent far end spectra, and
   wherein calculating the distance value d includes using a set of preset mapping templates $T_i$ which mapping templates modify the near end spectra and/or the far end spectra in order to take into account for prototypic realistic acoustic transfer functions.

12. The method according to claim 11, wherein using the set of preset mapping templates $T_i$ is performed by calculating a different distance value d for each preset mapping template $T_i$ and choosing the minimal distance value as the final distance value.

* * * * *